(12) United States Patent
Shariff et al.

(10) Patent No.: US 12,448,575 B2
(45) Date of Patent: Oct. 21, 2025

(54) LOW SALINITY WATER PRODUCTION IN CRUDE OIL PROCESSING

(71) Applicant: Saudi Arabian Oil Company, Dhahran (SA)

(72) Inventors: Maher Maqbool Shariff, Dhahran (SA); Sebastien A. Duval, Dhahran (SA); Simone Less, Dhahran (SA); Olanrewaju Malcolm Oshinowo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 276 days.

(21) Appl. No.: 18/355,921

(22) Filed: Jul. 20, 2023

(65) Prior Publication Data

US 2025/0026993 A1    Jan. 23, 2025

(51) Int. Cl.
 *C10G 53/06* (2006.01)

(52) U.S. Cl.
 CPC ..... *C10G 53/06* (2013.01); *C10G 2300/1033* (2013.01); *C10G 2300/4081* (2013.01)

(58) Field of Classification Search
 CPC ............ C10G 53/06; C10G 2300/1033; C10G 2300/4081; C10G 33/02; C10G 31/08
 See application file for complete search history.

(56) References Cited

U.S. PATENT DOCUMENTS

| | | | |
|---|---|---|---|
| 7,014,756 B2 | 3/2006 | Costinel | |
| 7,140,441 B2 | 11/2006 | Hauge et al. | |
| 7,497,954 B2 | 3/2009 | Ivan et al. | |
| 8,778,174 B2 | 7/2014 | Xia et al. | |
| 8,951,422 B2 | 2/2015 | Mundheim | |
| 9,017,559 B2 | 4/2015 | Mimura et al. | |
| 9,114,340 B2 | 8/2015 | Smith | |
| 9,663,936 B2 | 5/2017 | Hannemann et al. | |
| 10,260,010 B2 | 4/2019 | Soliman | |
| 10,537,830 B2 | 1/2020 | Less et al. | |
| 10,703,989 B2 | 7/2020 | Koleshwar et al. | |
| 10,926,192 B2 | 2/2021 | Less et al. | |
| 10,926,193 B2 | 2/2021 | Less et al. | |
| 10,926,194 B2 | 2/2021 | Less et al. | |

(Continued)

OTHER PUBLICATIONS

International Search Report and Written Opinion in International Appln. No. PCT/US2024/038486, mailed on Oct. 25, 2024, 12 pages.

*Primary Examiner* — Randy Boyer
*Assistant Examiner* — Juan C Valencia
(74) *Attorney, Agent, or Firm* — Fish & Richardson P.C.

(57) ABSTRACT

A side-stream is separated from an oil phase stream that is discharged from a crude oil separator in a gas-oil separation plant. The side-stream contains water and oil. At least a portion of the oil phase stream that is discharged from the crude oil separator in the gas-oil separation plant is flowed to a desalter in the gas-oil separation plant. An electric field is applied across the side-stream to coalesce aqueous droplets present in the side-stream to form an aqueous phase. The aqueous phase is separated from the oil of the side-stream. At least a portion of the aqueous phase is evaporated to form a wastewater phase and a vapor phase. At least a portion of the vapor phase is condensed to produce a wash water. The wash water is flowed to the desalter. The wash water can be referred to washing water or dilution water.

20 Claims, 7 Drawing Sheets

(56) References Cited

U.S. PATENT DOCUMENTS

| | | |
|---|---|---|
| 10,926,195 B2 | 2/2021 | Less et al. |
| 10,926,196 B2 | 2/2021 | Less et al. |
| 10,927,538 B2 | 2/2021 | Kent |
| 2017/0210643 A1 | 7/2017 | Sato et al. |
| 2018/0187095 A1 | 7/2018 | Soliman |
| 2019/0211274 A1* | 7/2019 | Soliman .................. C02F 1/463 |
| 2019/0330080 A1 | 10/2019 | Smiddy et al. |
| 2021/0213375 A1 | 7/2021 | Shariff et al. |
| 2021/0395619 A1 | 12/2021 | Raynel et al. |
| 2022/0315843 A1 | 10/2022 | Soliman |

* cited by examiner

LOW SALINITY WATER PRODUCTION IN CRUDE OIL PROCESSING

TECHNICAL FIELD

This disclosure relates to crude oil processing.

BACKGROUND

A gas oil separation plant (GOSP) may be a system employed to process crude oil received from a wellhead. The crude oil received may be obtained via the wellhead from a hydrocarbon-bearing reservoir in a subterranean formation. The GOSP may have a train of vessels that operate at sequentially lower pressure to remove volatile gases, water, and salt from the crude oil. The GOSP may discharge the processed crude oil as export crude oil (product crude oil) for distribution including to storage and transportation for further processing, such as in a petroleum refinery.

The crude oil received at the GOSP from the wellhead typically includes produced water. Therefore, the crude oil may be a mixture of oil, emulsified or free produced water, and gas. The emulsion may include water droplets dispersed in a continuous phase of oil. Moreover, emulsifying agents utilized in the upstream production of the crude oil may be present in the crude oil received at the GOSP. The produced water in the crude oil (emulsion) may be salty water produced along with the crude oil. Thus, the crude oil received at the GOSP may be an oil-water emulsion and have salt in the water in the emulsion. The salt content can include chloride and bromide salts, such as sodium chloride (NaCl), calcium chloride ($CaCl_2$)), magnesium chloride ($MgCl_2$), potassium chloride (KCl), and other inorganic salts. The salt in crude oil streams may generally be salt in water droplets in the crude oil stream.

Wash water (e.g., fresh water or low-salinity water), also referred to as washing water or dilution water, may be employed in the GOSP to facilitate the removal of salt to lower the salt content of the crude oil (e.g., export crude oil) to specification or below specification in a process called desalting. In a desalting vessel, low water-cut emulsions can be mixed with wash water to reduce (dilute) the concentration of dissolved salt in the water droplets in the crude oil. The water is separated from the crude oil in the desalting vessel, thereby reducing the salt content in the outgoing crude. In some instances, produced crude oil (export crude oil) from GOSPs should generally have a salt content of less than, for example, 10 pounds per thousand barrels (PTB) to be acceptable to certain international crude buyers.

SUMMARY

This disclosure describes technologies relating to low salinity water production in crude oil processing. The subject matter described in this disclosure can be implemented in particular implementations, so as to realize one or more of the following advantages. The production of low salinity water can be especially beneficial, for example, in arid or semi-arid climates where fresh or low-salinity water is a valuable resource. Heat that is used in the process can be sourced, for example, from existing heat sources in the crude oil processing facility and/or low carbon intensity heating sources, such as electrical heaters powered by concentrated solar panels (CSPs), wind turbines, or green hydrogen. The systems and methods described herein can be implemented to reduce the water-cut entering the first-stage electrostatic separator vessel or a dehydrator in a gas-oil separation plant by treating only a portion (for example, about half) of the crude oil feed, which can save on operation costs and eliminate the use of non-renewable water resources, such as aquifer water. The systems and methods described herein can be implemented to produce a low-salinity wash water within the gas-oil separation plant, which can be directly used in the desalter(s) of the gas-oil separation plant. The systems and methods described herein can be implemented to produce a wash water independent of membrane systems, which are typical to conventional water processing units (such as osmosis and reverse osmosis). The systems and methods described herein can be implemented to capitalize on the intrinsic thermal energy and pressure available from the crude oil that is received at gas-oil separation plants, thereby avoiding operating and energy costs associated with pressurization and heating of fluids.

Certain aspects of the subject matter described can be implemented as a method. A side-stream is separated from an oil phase stream that is discharged from a crude oil separator in a gas-oil separation plant. The side-stream contains water and oil. At least a portion of the oil phase stream that is discharged from the crude oil separator in the gas-oil separation plant is flowed to a desalter in the gas-oil separation plant. An electric field is applied across the side-stream to coalesce aqueous droplets present in the side-stream to form an aqueous phase. The aqueous phase is separated from the oil of the side-stream. At least a portion of the aqueous phase is evaporated to form a wastewater phase and a vapor phase. At least a portion of the vapor phase is condensed to produce a wash water. The wash water is flowed to the desalter. The wash water can be referred to washing water or dilution water.

This, and other aspects, can include one or more of the following features. The oil from the side-stream can be rejoined with a remainder of the oil phase stream that is discharged from the crude oil separator to form a rejoined oil phase. The rejoined oil phase can be flowed to a second crude oil separator in the gas-oil separation plant. The second crude oil separator can separate the rejoined oil phase into a gas phase, a second oil phase, and a second wastewater phase. The portion of the oil phase stream discharged from the crude oil separator and flowed to the desalter can include at least a portion of the second oil phase from the second crude oil separator. The portion of the aqueous phase can be evaporated via heat exchange with at least a portion of the gas phase from the second crude oil separator. The side-stream can be heated prior to coalescing the aqueous droplets. The side-stream can be heated via heat exchange with at least a portion of the aqueous phase. The side-stream can additionally be heated via heat exchange with at least a portion of the wastewater phase. The wash water can be produced independent of use of a membrane.

Certain aspects of the subject matter described can be implemented as a system. The system includes a side-stream, a coalescer, a separator, a heat exchanger, a knockout drum, a condenser, and a desalter. The side-stream branches from an oil phase stream that is discharged from a crude oil separator in a gas-oil separation plant. The side-stream contains water and oil. The coalescer is configured to receive the side-stream and apply an electric field across the side-stream to coalesce aqueous droplets present in the side-stream to form an aqueous phase separate from an oil phase. The separator is configured to receive the side-stream from the coalescer and separate the aqueous phase from the oil phase. The heat exchanger is configured to receive and evaporate at least a portion of the aqueous phase from the separator. The knockout drum is configured to receive the aqueous phase from the heat exchanger and separate the aqueous phase into a wastewater phase and a vapor phase. The condenser is configured to receive and cool the vapor phase to condense at least a portion of the vapor phase into a wash water. The desalter is configured to receive and mix at least a portion of the oil phase stream discharged from the crude oil separator and the wash water.

This, and other aspects, can include one or more of the following features. The system can include a second crude oil separator. The second crude oil separator can be configured to receive a rejoined oil phase. The rejoined oil phase can include the oil phase from the separator and a remainder of the oil phase stream discharged from the crude oil separator. The second crude oil separator can be configured to separate the rejoined oil phase into a gas phase, a second oil phase, and a second wastewater phase. The portion of the oil phase stream discharged from the crude oil separator and received by the desalter can include at least a portion of the second oil phase from the second crude oil separator. The heat exchanger can be configured to evaporate at least the portion of the aqueous phase via heat exchange with at least a portion of the gas phase from the second crude oil separator. The system can include a second heat exchanger. The second heat exchanger can be positioned upstream of the coalescer. The second heat exchanger can be configured to heat the side-stream prior to the coalescer receiving the side-stream. The second heat exchanger can be configured to heat the side-stream via heat exchange with at least a portion of the aqueous phase from the separator. The system can include a third heat exchanger. The third heat exchanger can be positioned upstream of the second heat exchanger. The third heat exchanger can be configured to further heat the side-stream prior to the coalescer receiving the side-stream. The third heat exchanger can be configured to further heat the side-stream via heat exchange with at least a portion of the wastewater phase from the knockout drum. The system can be configured to produce the wash water independent of use of a membrane.

Certain aspects of the subject matter described can be implemented as a method. In a first crude oil separator in a gas-oil separation plant, a crude oil stream is separated into a first gas stream, a first oil stream, and a first aqueous stream. The first oil stream contains water and oil. The first oil stream is split into a first portion and a second portion. Aqueous droplets present in the first portion are coalesced to form an aqueous phase separate from an oil phase. At least a portion of the aqueous phase is evaporated to form a wastewater stream and a water vapor stream. The water vapor stream is condensed to produce a wash water stream. The oil phase is mixed with the second portion to form a rejoined oil phase. In a second crude oil separator in the gas-oil separation plant, the rejoined oil phase is separated into a second gas stream, a second oil stream, and a second aqueous stream. At least a portion of the second oil stream is flowed to a desalter in the gas-oil separation plant. The wash water stream is flowed to the desalter.

This, and other aspects, can include one or more of the following features. Prior to coalescing the aqueous droplets, the first portion can be heated via heat exchange with at least a portion of the aqueous phase, at least a portion of the wastewater stream, or both.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes production of low salinity water in a crude oil processing facility. The process simultaneously reduces water-cut in crude oil emulsions and produces low salinity water from the formation water that is produced along with the wet crude oil. The process includes heating a portion of the crude oil emulsion, electrically-induced coalescence of the aqueous phase, and separation of the oil and aqueous phases. The oil phase that has been separated can be recirculated to the inlet of the process or flowed to another process, such as a dewatering process. The aqueous phase is flowed to a vessel for water vapor extraction. The water vapor that has been extracted from the vapor phase is then condensed to form the low salinity water. The low salinity water can then be used, for example, in a crude oil desalting process.

Figure 1:
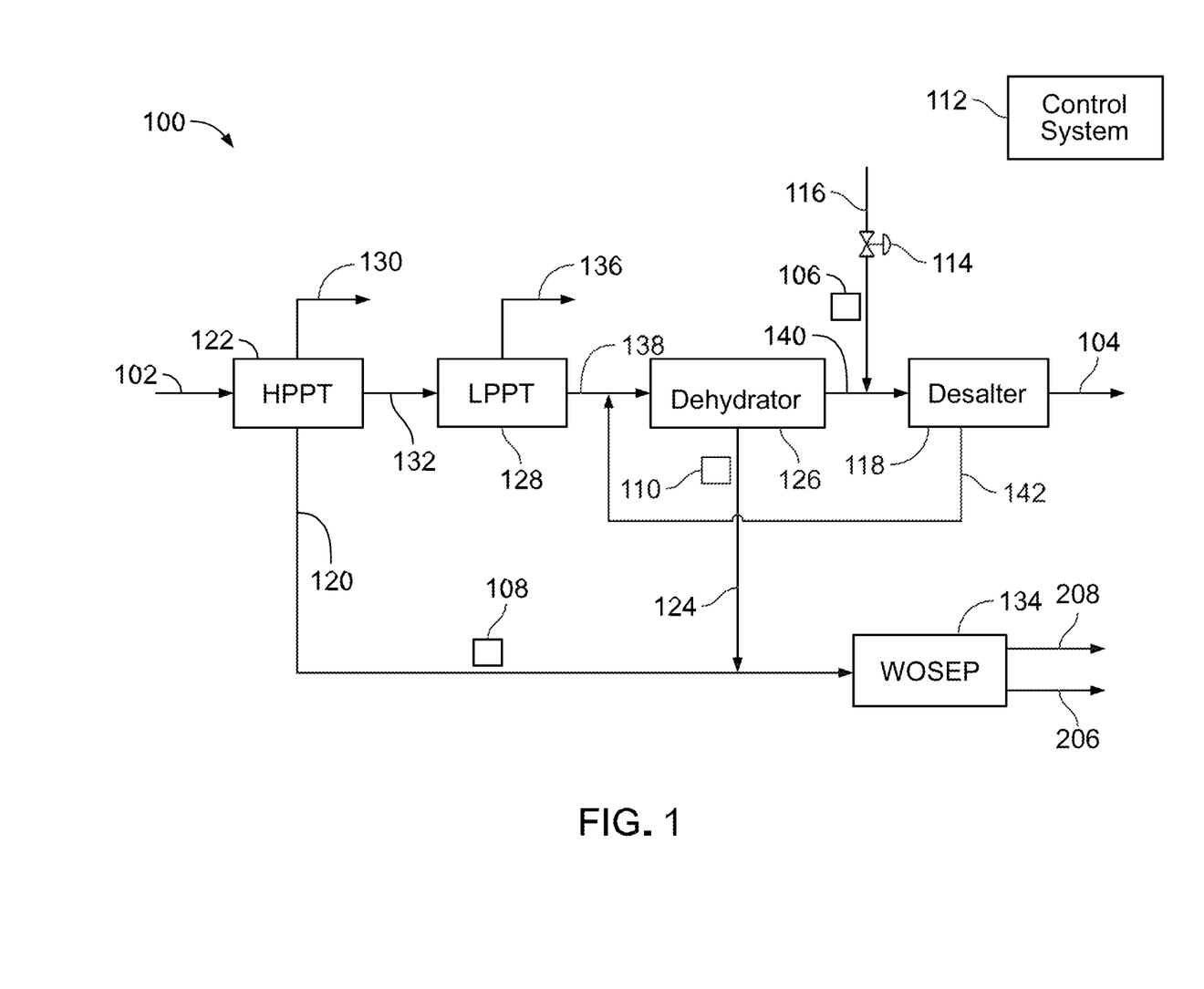
FIG. 1 is a schematic diagram of an example gas-oil separation plant for crude oil processing.

FIG. 1 is a schematic diagram of an example gas-oil separation plant (GOSP) 100 that processes crude oil 102 received from a wellhead and discharges export crude oil 104 as product. As discussed below, the GOSP 100 removes salt from the crude oil 102. The salt is dissolved in the fine water droplets in the crude oil 102 and generally not in the crude oil 102 itself. The salt content can include chloride and bromide salts. For example, the salt content can include sodium chloride (NaCl), calcium chloride ($CaCl_2$)), magnesium chloride ($MgCl_2$), potassium chloride (KCl), and other inorganic salts. The GOSP 100 includes multiple analyzer instruments (e.g., 106, 108, 110, etc.) to measure salt concentration of streams internal in the GOSP 100 such that the salt concentration in the export crude 104 can be calculated. The analyzer instruments may measure sodium to give the salt concentration as based on sodium chloride (NaCl). The control system 112 (or computer system) can perform a mass balance to determine (calculate) salt content in the export crude oil 104 based on the measurements by the analyzer instruments. In view of the measurements by the analyzer instruments, the control system 112 may direct the flowrate set point of the flow control valve 114 (or wash-water pump) that controls the flowrate of the wash water 116 supplied to the desalter 118 vessel.

The multiple analyzer instruments (e.g., 106, 108, 110, etc.) may each be an online analyzer instrument (analyzer tool) to measure concentration of salt (e.g., NaCl) in water in a stream. The online analyzer instrument may be disposed along a conduit conveying the stream. The illustrated embodiment includes at least three such online analyzer instruments that measure salt concentration: (1) online analyzer instrument 106 that measures salt concentration in the wash water 116; (2) online analyzer instrument 108 that measures salt concentration in the water 120 that discharges from the high-pressure production trap (HPPT) 122; and (3) online analyzer instrument 110 that measures salt concentration in the water of the oily water 124 that discharges from the dehydrator 126 vessel. The analytical techniques, mass balances, and control schemes are discussed below with respect to subsequent figures.

The feed crude oil 102 received at the GOSP 100 from a well may be as produced from a subterranean formation through a wellbore (and production manifold) to the GOSP 100. The feed crude oil 102 may flow through a production manifold associated with one or more wellheads to the GOSP 100. The feed crude oil 102 may be from a well pool. The feed crude oil 102 may include water and thus be labeled as wet crude oil. The feed crude oil 102 received at the GOSP 100 may be a tight emulsion of oil and water in some examples. A tight emulsion is generally an emulsion with small and closely distributed droplets.

The GOSP 100 removes gas, water, and salt from the crude oil 102. The GOSP 100 may remove hydrocarbons as gas from the crude oil via lowering pressure of the crude oil 102. The removed hydrocarbons may be light hydrocarbons (e.g., C1 to C4) and medium or heavier hydrocarbons (e.g., C5+).

In the illustrated implementation, the GOSP 100 includes the HPPT 122, a low-pressure production trap (LPPT) 128, the dehydrator 126, and the desalter 118. The HPPT 122, LPPT 128, dehydrator 126, and desalter 118 may be characterized as components of a GOSP 100 train. The HPPT 122, LPPT 128, dehydrator 126, and desalter 118 are each a separator vessel that may have a horizontal orientation or vertical orientation. In embodiments, the HPPT 122, LPPT 128, dehydrator 126, and desalter 118 are all horizontal vessels. In certain examples, the HPPT 122 vessel, LPPT 128 vessel, dehydrator 126 vessel, and desalter 118 vessel each have semi-elliptical-type heads, hemispherical heads, or torispherical heads.

The HPPT 122 vessel, LPPT 128 vessel, dehydrator 126 vessel, and desalter 118 vessel generally include nozzles (e.g., flanged, screwed connections, etc.) on the vessel body or heads to couple to conduits for receiving and discharging streams. An inlet on the vessel may be a nozzle that couples to (for example, connects to or attaches to) a feed or supply conduit to the vessel. An outlet on the vessel may be a nozzle (or multiple nozzles) that couples to a discharge conduit from the vessel. Nozzles on the vessels may also be employed for instrumentation (e.g., sensors, gauges, transmitters, etc.) and other uses.

In operation, the HPPT 122 may receive the feed crude oil 102 via a conduit. The HPPT 122 as a separation vessel may provide for a three-phase separation. In particular, the HPPT 122 separates gas 130 and water 120 from the feed crude oil 102 and discharges crude oil 132. This HPPT water 120 discharge stream is generally not oily due to the fact that there is typically a constant water level in the HPPT 122, which keeps the oil droplets at the interface, not in the bulk. The HPPT 122 vessel may include an inlet separation device to promote separation of the gas 130 from the feed crude oil 102. The inlet separation device may promote an initial gross separation by changing the flow direction of the feed crude oil 102 entering the HPPT 122 vessel. The inlet separation device may be, for example, an inlet diverter, a vane-type inlet device, or a cyclonic inlet device.

The HPPT 122 as a three-phase separator vessel may utilize gravity or density difference to separate the water 120 from the crude oil 132. For instance, the HPPT 122 vessel may include a weir to facilitate the separation in which the oil (the lighter of the two liquids) overflows the weir. The water 120 may generally discharge from within the weir. The separated water 120 may be sent, for example, to a water/oil separator (WOSEP) 134 vessel. The WOSEP 134 may discharge a water stream 208 and a recovered oil stream 208. In implementations, the operating pressure in the HPPT 122 may be at least 50 pounds per square inch gauge (psig). The operating temperature in the HPPT 122 may be, for example, at least about 65° F., or in a range of 65° F. to 160° F.

The separated gas 130 that discharges from the HPPT 122 may generally be light hydrocarbons. The feed crude oil 102 is reduced in pressure in the HPPT 122 to separate the gas 130. In embodiments, the gas 130 may be light hydrocarbons (C1-C4) having a number of carbons in the range 1 to 4 and trace amount of C5+ hydrocarbons having five or more carbons. In examples, the gas 130 as a light (or lighter) hydrocarbon stream may generally be C1-C4 components (e.g., methane, ethane, propane, butane, isobutane) and trace amounts of C5+ compounds. The pressure of the gas 130 as discharged may range in pressure, for example, from 50 psig to 450 psig depending, for instance, on the supply pressure of the feed crude oil 102. The gas 130 can include lighter hydrocarbons, traces of C5+ hydrocarbons, hydrogen sulfide ($H_2S$), carbon dioxide ($CO_2$), nitrogen ($N_2$), and water vapor. The relative amounts and types of compounds in the gas 130 may typically depend on composition of the feed crude oil 102 and the flash pressure in the HPPT 122. The separated gas 130 may be sent to a mechanical compressor or to a gas plant for recovery.

The crude oil 132 is discharged from the HPPT 122 via a conduit to the LPPT 128. The motive force for flow of the crude oil 132 may be pressure differential. The LPPT 128 operates at a lower pressure than the HPPT 122. In implementations, the operating pressure in the LPPT 128 may be equal to or less than 3 psig. The operating temperature of the LPPT 128 may be, for example, at least about 65° F., or in a range of 65° F. to 160° F. The LPPT 128 vessel may include an inlet device to promote an initial gross separation of gas 136 from the crude oil 132 by changing the flow direction of the entering crude oil 132.

The LPPT 128 may be characterized as a two-phase separation vessel or three-phase separation vessel. The LPPT 128 separates gas 136 (e.g., certain remaining off-gases) from the crude oil 132 and discharges a crude oil 138 stream. The gas 136 may typically be heavier hydrocarbons. The medium or heavy hydrocarbon stream as the gas 136 may refer generally to C5+ (five-carbon and greater) hydrocarbons (e.g., pentane, isopentane, hexane, and heptane) and trace amounts of lighter hydrocarbons and other light components. In certain examples, the gas 136 may discharge at a pressure of, at least 3 psig, or in a range of 3 psig to 90 psig. The gas 136 may be sent to a mechanical compressor or gas compression plant for recovery.

The crude oil 138 discharged from the LPPT 128 may be sent to the dehydrator 126. In implementations, the crude oil may be pumped from the LPPT 128 to the dehydrator 126 via a pump (not shown). The pump may be, for example, a centrifugal pump. In certain implementations, the crude oil 138 may flow through a heat exchanger (not shown) to heat the crude oil 138. The heat exchanger may be, for example, a shell-and-tube heat exchanger, a plate-and-frame heat exchanger, etc. In operation, the pump head provides motive force for flow of the crude oil 138 through the heat exchanger to the dehydrator 126. The heat exchanger heats the crude oil 138 to advance downstream separation of water and salt from the crude oil. This increase in temperature of the crude oil 138 may reduce fluid viscosity and may promote settling of water droplets from the crude oil in downstream processing. The heat transfer fluid for the heat exchanger may be, for example, steam or steam condensate, or a process stream (e.g., crude oil from a stabilizer column (not shown)). The crude oil 138 may be heated in the heat exchanger via cross-exchange with other crude oil to recover heat from the other crude oil. In some embodiments, a low-pressure degassing tank (LPDT) (not shown) may replace the LPPT 128 and may be operationally disposed between the HPPT 122 and the dehydrator 126.

In the dehydrator 126 vessel, water 124 is separated from the crude oil 138. Salt may discharge with the water 124 and thus be removed from the crude oil 140. Electrostatic coalescence may be employed in the dehydrator 126. In implementations, an electrostatic field is generated between electrodes in the dehydrator 126 vessel. Electrostatic coalescence applies an electric current, causing water droplets in the crude oil (emulsion) to collide, coalesce into larger (heavier) drops, and settle out of the crude oil as separate liquid water. This process partially dries wet crude oil. In one example, operating conditions of a dehydrator 126 unit include temperature in a range of 70° F. to 160° F., and a pressure at about 25 psig above the crude oil 140 vapor pressure. In some examples, fresh or recycle wash water (e.g., relatively low in salt) and/or chemicals may be injected into the dehydrator 126 vessel to advance separation of the water 124 from the crude oil 138. The separated water 124 discharged from the dehydrator 126 may be oily water (e.g., having salt) and sent to the WOSEP 134 vessel. In examples, oily water may have less than 10 volume percent (vol. %) or less than 1 vol. % oil. The dehydrator 126 vessel may discharge crude oil 140 via a conduit to the desalter 118 vessel. The crude oil 140 may be labeled as dehydrated crude oil with some salt removed in implementations.

The salt removal in the GOSP 100 can be multi-stage. Both the desalter 118 and the dehydrator 126 may provide for salt removal. Thus, the embodiment of FIG. 1 may be two-stage desalting (salt removal). Moreover, in some examples, the desalter 118 can be two or more desalter vessels in series.

In the illustrated example, a single desalter 118 vessel is depicted. Water 142 having salt discharges from the desalter 118 and may be recycled to the dehydrator 126. Wash water 116 (e.g., fresh water) may be added to the desalter 118 vessel to facilitate removal of salt from the crude oil 140. Wash water 116 may be supplied to the desalter 118 to promote the separation generated by the electrostatic field in the desalter 118 vessel. The wash water 116 may be injected into the dehydrated crude oil 140 entering the desalter 118 to wash the crude oil to meet the salt content specification of the produced crude (export crude oil 104). The water 116 added may be low in salt concentration relative to the salt concentration of water (e.g., emulsified water) in the crude oil 140. Fresh wash water (as opposed, for example, to recycle water having more salt) may be utilized in the desalting process to increase the amount of salt rinsed from the crude oil 140. Wash water 116 salinity (total dissolved solids, TDS) can range, for example, from between about 100 parts per million (ppm) to about 12,000 ppm. Again, wash water 116 may be more effective if the salinity (TDS) level is low. In comparison, formation water salinity produced with crude oil can reach as high as about 400,000 ppm of salt or more.

The flowrate of the wash water 116 may be controlled via the flow control valve 114 as depicted. The valve opening (e.g., percent open) of the flow control valve may be adjusted by a flow controller (FC) to maintain flowrate of the wash water 116 per a flowrate set point of the flow controller for the control valve 114. The set point for the control valve 114 may be manually set locally or manually entered into the control system 112. On the other hand, the specifying of the flowrate of the wash water 116 may be automated. In particular, the set point for the control valve 114 may be specified by the control system 112 based on feedback from online analyzer instruments and meters in the GOSP 100. For example, the control system 112 may determine and specify the set point for the control valve 114 based in part on feedback from the online analyzer instruments 106, 108, 110.

In addition to (or in lieu of) the control valve 114, flowrate of the wash water 116 may be controlled via the speed of the pump supplying the wash water 116. The pump may be, for example, a positive displacement pump or a centrifugal pump. The speed of the pump may be manually set. In embodiments, the control valve 114 may determine and specify the speed of the pump to give the desired flowrate of wash water 116. The desired flow rate may be control-system 112 specified based at least (based in part) on measurements by the analyzer instruments 106, 108, 110. To give the desired flowrate of wash water 116, the speed of the pump may be set, for example, by adjusting the pump stroke (e.g., the number of strokes per time, the number of stroke cycles per time, the length of a stroke, etc.). In some implementations, the adjustment of the pump stroke may be manual (local) or remotely adjusted by the control system 112 to give the flowrate wash water 116 specified by the control system 112.

As in the upstream dehydrator 126, electrostatic coalescence may be employed in the desalter 118 vessel. Electrostatic coalescence may remove water from the crude oil 140. Operating conditions in the desalter 118 may be, for example, include a temperature in a range of 70° F. to 160° F. and an operating pressure at least 25 psig above vapor pressure of the crude oil 140. The wash water 116 may increase the water droplet number concentration to promote coalescence to form larger and more easily separated water droplets to meet the crude salt content specification. Both the flowrate and quality (salinity) of wash water 116 may affect the crude desalting process. The desalter 118 may reduce the salt content of crude oil 140, for example, to less than 10 pounds of salt per thousand barrels (PTB) of oil.

The crude oil that discharges from the desalter 118 may be the export crude oil 104. The desalter 118 may discharge the export crude oil 104 for distribution including to storage and transportation, and for further processing such as in a petroleum refinery. The export crude oil 104 may be labeled as processed crude oil, product crude oil, stabilized crude oil, and so forth. The salt content of the export crude oil 104 may be monitored manually by periodically determining the salt content through laboratory analysis (e.g., once per 8-hour shift). The salt content of the export crude oil 104 may be continuously monitored with an automated online analyzer. The output from the online analyzer may be used, in part, to control the wash water flow rate to the desalter 118. The salt content of the export crude oil 104 may be monitored by determining the salt content based on calculating a salt mass balance (e.g., in real time) in the GOSP 100 utilizing online data for streams in the GOSP 100.

Specifications for the export crude oil 104 may include, for example: (1) salt content less than 10 PTB; (2) basic sediment and water (BS&W) content less than 0.2 volume percent (vol %) of the crude oil; (3) hydrogen sulfide ($H_2S$) content less than 70 ppm by weight (ppmw); and (4) maximum true vapor pressure (TVP) (per ASTM D 2879) less than 13 pounds per square inch absolute (psia) at storage temperature. The BS&W is generally measured from a liquid sample of the crude oil. The BS&W includes water, sediment, and emulsion. The BS&W is typically measured as a volume percentage of the crude oil. The BS&W specification may be less than 0.5 vol % for Heavy crude oil and less than 0.2 vol % for other crude oils.

In some examples, the desalter 118 may discharge the export crude oil 104 via a conduit to a stabilizer distillation column (not shown) that separates and removes light ends or light components (volatile components such as C1-C4 hydrocarbons) as gas from the export crude oil 104. These light components may discharge as an overhead stream from the stabilizer distillation column. This removal of the light components reduces vapor pressure of the export crude oil 104 to give a desired vapor pressure of the export crude oil 104 as stabilized crude oil. The associated specification of the export crude oil 104 may be, for example, Reid vapor pressure (RVP) or true vapor pressure (TVP), or both. The term "stabilized" may refer to the crude oil having a lower vapor pressure and thus being less volatile to facilitate tank storage and pipeline transport. The stabilization may be, for example, to lower the vapor pressure of the crude oil to at least 13 pounds per square inch (psi) below atmospheric pressure so that vapor will generally not flash under atmospheric conditions. The stabilizer distillation column may remove $H_2S$ from the export crude oil 104 to sweeten the crude oil. The $H_2S$ may discharge in the overhead stream in the light components. The terms "sweet" crude oil or to "sweeten" crude oil refers to lower $H_2S$ content in the crude oil. In the stabilizer distillation column, any $H_2S$ gas dissolved in the export crude oil 104 is removed to meet crude-oil specification of $H_2S$ content, for example, less than 60 ppm, or in a range of 10 ppm to 70 ppm. If a stabilizer distillation column is employed, the stabilized export crude oil 104 may be discharged as the bottom streams from the stabilizer distillation column and pumped via the column bottoms pump to storage or distribution.

The GOSP 100 may include a control system 112 that facilitates or directs operation of the GOSP 100. For instance, the control system 112 may direct control of the supply or discharge of flow streams (including flowrate) and associated control valves, control of operating temperatures and operating pressures, and so on. The control system 112 (or associated computer system) may perform salt mass-balance calculations of the GOSP 100 to determine (monitor) the salt content in the export crude oil 104. The determination may be based on on-line analysis upstream (internal) in the GOSP 100. The salt content in the export crude oil 104 may be determined in real time (or substantially real time) without online analysis of the export crude oil 104 itself. The salt content in the export crude oil 104 may be determined in real time (or substantially real time) with manual sampling and/or online analysis of the export crude oil 104.

In some implementations, the control system 112 may calculate or otherwise determine set points of control devices. For instance, the control system 112 may specify the set point of the flow control valve 114 (or specify number of strokes per time for a wash-water supply pump) on the wash water 116 supply to the desalter 118. In some cases, the set point of a control device can be input manually. In some cases, the set point of a control device can be calculated and/or adjusted by the control system 112.

The control system 112 may include a processor and memory storing code (e.g., logic, instructions, etc.) executed by the processor to perform calculations and direct operations of the GOSP 100. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 112 may include a desktop computer, laptop computer, computer server, control panels, programmable logic controller (PLC), distributed computing system (DSC), controllers, actuators, or control cards.

The control system 112 may be communicatively coupled to a remote computing system that performs calculations and provides direction. The control system 112 may receive user input or remote-computer input that specifies the set points of control devices or other control components in the GOSP 100. The control system 112 may employ local control panels distributed in the GOSP 100. Certain implementations may include a control room that can be a center of activity, facilitating monitoring and control of the GOSP 100 process or facility. The control room may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

As indicated, after dewatering the crude oil 102 emulsion in the phase separators HPPT 122 and LPPT 128 (and/or LPDT), the crude oil 138 stream undergoes a stage of desalting at each of the dehydrator 126 and the desalter 118. If not desalted, the small brine droplets contained in the crude oil 138 stream leaving the LPPT 128 (or LPDT) may corrode pipes and storage tanks. In addition to the corrosion of metallic equipment, high concentration of salts within these brine droplets could foul or plug trays in distillation columns, heat-exchanger tubes, etc. at downstream refineries. Therefore, the level of salt in the export crude oil 104 is regulated and controlled, for example, to under 10 pounds salt (as sodium chloride equivalent) per 1,000 barrels crude oil (10 lbm salt/1000 bbl crude oil or PTB) for transportation and storage, and to under 1 lbm salt/bbl crude oil for petroleum refineries. One pound salt per thousand barrels is equivalent to 28.5 gram of salt/$m^3$ (or ppmw). In some examples, the water volume fraction (level of residual brine) may be regulated and controlled to maximum 0.5 volume percent (vol %) for heavy crude oils (e.g., Heavy Arabian crude oil) and maximum 0.2 vol % for other crude oils (e.g., Arabian crude oils). The water volume fraction may be regulated and controlled to other product-specification values (vol %) for water volume fraction as applicable for other types or grades of crude oil, or may be customer dependent.

As indicated, aspects of the present disclosure may provide: (1) real-time, automated wash-water 116 flowrate to the desalter 118 for control of salt content in the export crude oil 104; and (2) real-time monitoring (via calculation) of the salt content in the export crude oil 104 that exits the desalter 118.

Figure 2A:
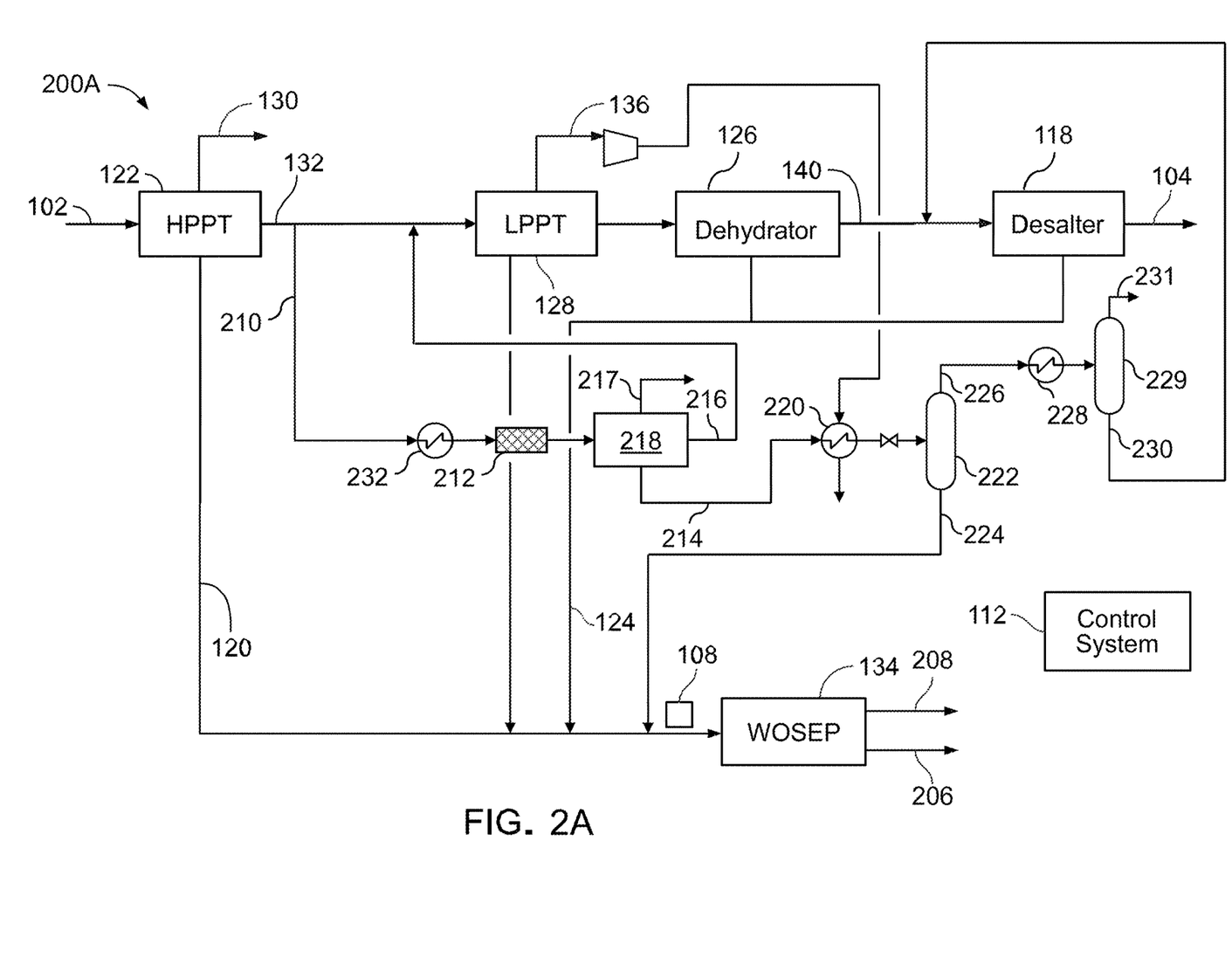
FIG. 2A is a schematic diagram of an example system for producing low salinity water in crude oil processing.

FIG. 2A is a schematic diagram of an example system 200A for producing low salinity water in crude oil processing. The system 200A can be implemented in a gas-oil separation plant (such as the GOSP 100). For example, the system 200A can an implementation of the GOSP 100 shown in FIG. 1, including additional components. The system 200A includes a side-stream 210 that branches from the crude oil 132. Although labeled as crude oil 132, the crude oil 132 still includes some water content that is to be removed by downstream equipment (such as the LPPT 128 and dehydrator 126). Thus, the side-stream 210 contains water and oil. The side-stream 210 has a water content that is non-zero. The system 200A includes a coalescer 212. The coalescer 212 receives the side-stream 210 and coalesces aqueous droplets present in the side-stream 210 to form an aqueous phase that is separate from an oil phase. The coalescer 212 can, for example, be an electrostatic coalescer that applies an electric field across the side-stream 210 within the coalescer 212. Because the water in the side-stream 210 includes dissolved salt (that is, has a non-zero salt content), the electric field can promote coalescence of the aqueous droplets via the attractive ion charges in the droplets.

The system 200A includes a separator 218 downstream of the coalescer 212. The separator 218 receives the side-stream 210 from the coalescer 212 and separates the aqueous phase 214 from the oil phase 216. The separator 218 discharges the aqueous phase 214 and the oil phase 216 separately. In some cases, the separator 218 discharges a gas phase 217 that can, for example, be combined with the gas 136 discharged by the LPPT 128 and/or be sent to the flare for burning. The system 200A includes a heat exchanger 220 downstream of the separator 218. The heat exchanger 220 receives the aqueous phase 214 from the separator 218. The heat exchanger 220 heats the aqueous phase 214 to evaporate at least a portion of the aqueous phase 214 and form water vapor. In some implementations, the heat exchanger 220 is configured to heat the aqueous phase 214 via heat exchange with the gas 136 discharged by the LPPT 128. For example, the heat exchanger 220 can receive the aqueous phase 214 at a first side (for example, tube side) and the gas 136 at a second side (for example, shell side), and the heat exchanger 220 can transfer heat from the gas 136 at the second side to the aqueous phase 214 at the first side. In some implementations, the gas 136 discharged by the LPPT 128 can be compressed to both facilitate flow of the gas 136 and to heat the gas 136 prior to the heat exchanger 220 transferring the heat from the gas 136 to the aqueous phase 214. The system 200A includes a knockout drum 222 downstream of the heat exchanger 220. The knockout drum 222 receives the heated aqueous phase 214 from the heat exchanger 220 and separates the heated aqueous phase 214 into a wastewater phase 224 and a vapor phase 226. The wastewater phase 224 is an aqueous solution having a high concentration of salt. The vapor phase 226 is predominantly water vapor.

The system 200A includes a condenser 228 downstream of the knockout drum 222. The condenser 228 receives the vapor phase 226 and cools the vapor phase 226 to condense at least a portion of the vapor phase 226 into a wash water 230. The wash water 230 can be flowed to the desalter 118. The wash water 230 produced by the system 200A is a high purity water stream. The wash water 230 has a salinity level that is less than the wash water 116. In some implementations, the wash water 230 is at least 99%, at least 99.9%, or at least 99.99% water by weight. In some implementations, the wash water 230 has a TDS content of 100 ppm or less, 10 ppm or less, 1 ppm or less, 0.5 ppm or less, 0.4 ppm or less, 0.3 ppm or less, 0.2 ppm or less, or 0.1 ppm or less. In some implementations, the wash water 230 completely replaces the use of fresh wash water 116. In some implementations, the wash water 230 supplements the use of fresh wash water 116. As such, the use and need for fresh wash water 116 by the desalter 118 is reduced and/or eliminated, due to the production of the wash water 230 by the system 200A. It is noted that the wash water 230 produced by the system 200A is produced without the introduction and/or processing of a separate water source (such as seawater) and is also produced without the use of a membrane, which is typical in various osmosis processes for purifying water. In some implementations, the system 200A includes a second knockout drum 229 downstream of the condenser 228. The second knockout drum 229 can receive the vapor phase 226 that has been at least partially condensed by the condenser 228 and separate, for example, non-condensibles from the wash water 230. The second knockout drum 228 discharges the wash water 230 and an exhaust gas 231, separately. The exhaust gas 231 discharged by the second knockout drum 229 can, for example, be sent to the flare for burning.

In some implementations, the system 200A includes a second heat exchanger 232 upstream of the coalescer 212. The second heat exchanger 232 can receive the side-stream 210 and heat the side-stream 210 prior to the coalescer 212 receiving the side-stream 210. Heating (by the second heat exchanger 232) the side-stream 210 prior to coalescing (by the coalescer 212) the aqueous droplets present in the side-stream 210 can further facilitate coalescence of the aqueous droplets within the coalescer 212. In other words, heating the side-stream 210 upstream of the coalescer 212 can improve coalescence of the aqueous droplets present in the side-stream 210 within the coalescer 212. In some implementations, the second heat exchanger 232 heats the side-stream 210 via heat exchange with another process stream (for example, the gas 136 or the wastewater phase 224). In some implementations, the second heat exchanger 232 heats the side-stream 210 via heat input from a heat source, such as an electric heater or a CSP.

Figure 2B:
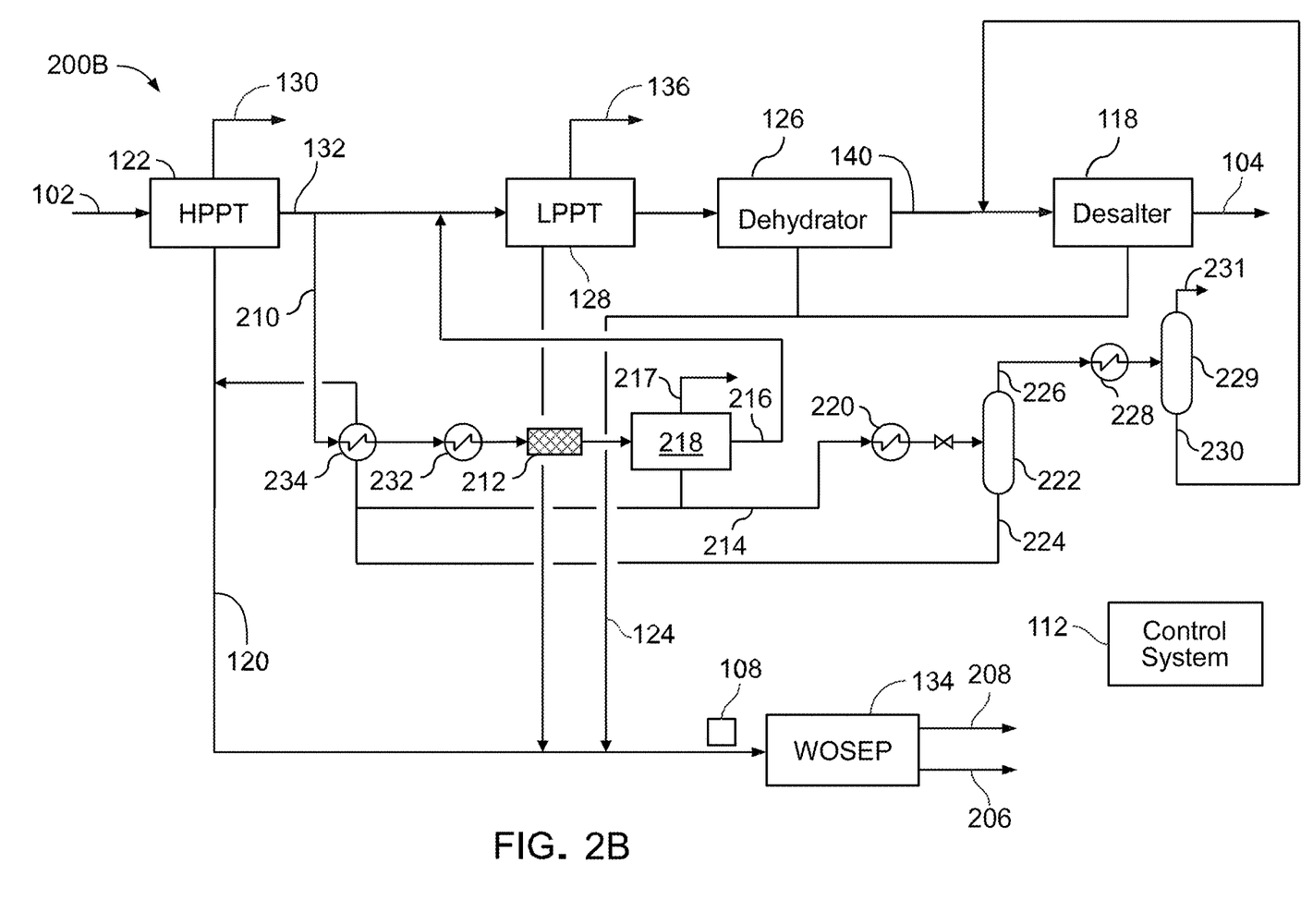
FIG. 2B is a schematic diagram of an example system for producing low salinity water in crude oil processing.

FIG. 2B is a schematic diagram of an example system 200B for producing low salinity water in crude oil processing. The system 200B can be implemented in a gas-oil separation plant (such as the GOSP 100). For example, the system 200B can an implementation of the GOSP 100 shown in FIG. 1, including additional components. The system 200B is substantially similar to the system 200A shown in FIG. 2A. In some implementations, as shown in FIG. 2A, the system 200B includes a third heat exchanger 234 upstream of the second heat exchanger 232. The third heat exchanger 234 can receive the side-stream 210 and heat the side-stream 210 prior to the second heat exchanger 232 heating the side-stream 210. The second and third heat exchangers 232, 234 can heat the side-stream 210 prior to coalescing (by the coalescer 212) the aqueous droplets present in the side-stream 210, which can facilitate coalescence of the aqueous droplets within the coalescer 212. In some implementations, the third heat exchanger 234 is configured to heat the side-stream 210 via heat exchange with at least a portion of the wastewater phase 224 discharged by the knockout drum 222. For example, the third heat exchanger 234 can receive the side-stream 210 at a first side (for example, shell side) and the wastewater phase 224 at a second side (for example, tube side), and the third heat exchanger 234 can transfer heat from the wastewater phase 224 at the second side to the side-stream 210 at the first side. In some implementations, heat exchanger 220 is configured to heat the aqueous phase 214 via heat input from a heat source, such as an electric heater or a CSP. In some implementations, the gas phase 217 discharged by the separator 218 can be combined with the gas 136 discharged by the LPPT 128. The combined gas phase 217 and the gas 136 can, for example, be compressed to be provided elsewhere (such as an end user, a different processing unit, or a pipeline).

Figure 3A:
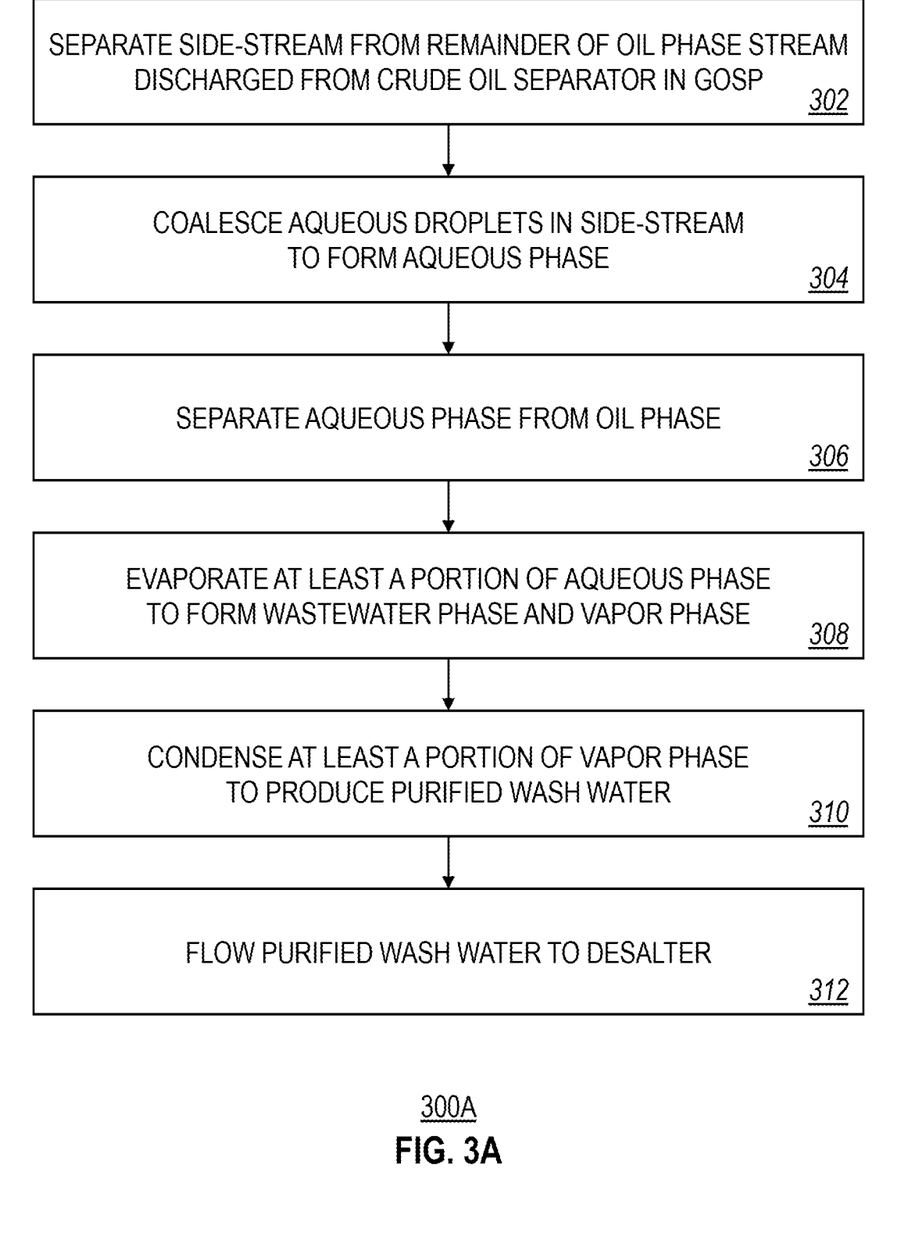
FIG. 3A is a flow chart of an example method for producing low salinity water in crude oil processing.

FIG. 3A is a flow chart of an example method 300A for producing low salinity water in crude oil processing. Any of systems 200A or 200B can, for example, implement the method 300A. Prior to method 300A, an oil phase stream (such as the crude oil 132) can be discharged from a crude oil separator (such as the HPPT 122) in a gas-oil separation plant (such as the GOSP 100, 200A, or 200B). At block 302, a side-stream (such as the side-stream 210) is separated from the crude oil 132 discharged from the HPPT 122. In some implementations, at least a portion of the crude oil 132 discharged from the HPPT 122 (for example, a remainder of the crude oil 132 excluding the side-stream 210) is flowed to a desalter (such as the desalter 118) in the GOSP (for example, the GOSP 100, 200A, or 200B). At block 304, an electric field is applied across the side-stream 210 to coalesce aqueous droplets present in the side-stream 210 to form an aqueous phase (such as the aqueous phase 214). Applying the electric field to coalesce the aqueous droplets present in the side-stream 210 can, for example, be implemented by the coalescer 212. At block 306, the aqueous phase 214 is separated from the oil (such as the oil phase 216) of the side-stream 210. Separating the aqueous phase 214 from the oil phase 216 at block 306 can, for example, be implemented by the separator 218. At block 308, at least a portion of the aqueous phase 214 is evaporated to form a wastewater phase (such as the wastewater phase 224) and a vapor phase (such as the vapor phase 226). Evaporating at least a portion of the aqueous phase 214 at block 308 can, for example, be implemented by the heat exchanger 220. At block 310, at least a portion of the vapor phase 226 is condensed to produce a wash water (such as the wash water 230). Condensing at least a portion of the vapor phase 226 at block 310 can, for example, be implemented by the condenser 228. At block 312, the wash water 230 is flowed to the desalter 118.

Figure 3B:
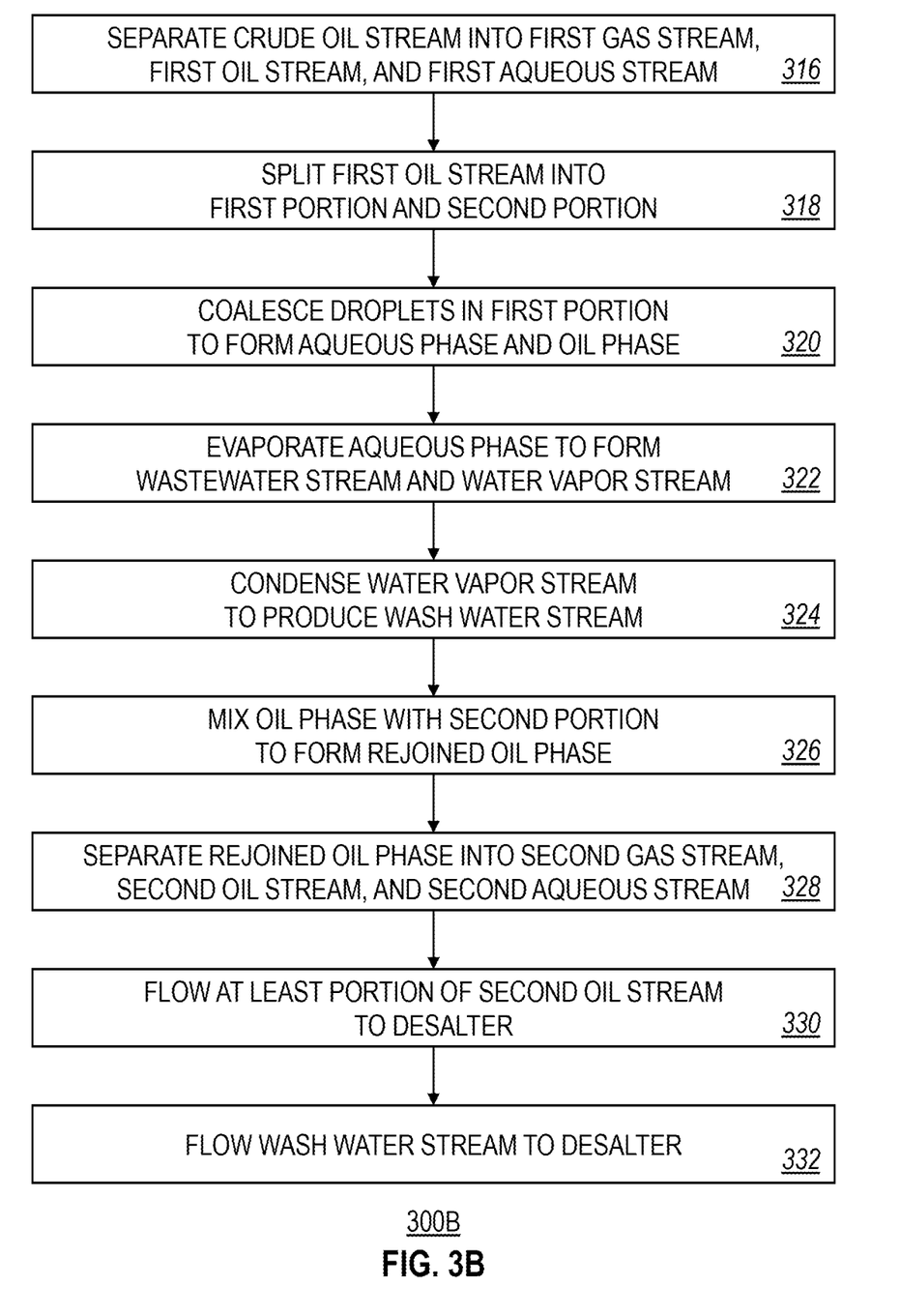
FIG. 3B is a flow chart of an example method for producing low salinity water in crude oil processing.

FIG. 3B is a flow chart of an example method 300B for producing low salinity water in crude oil processing. Any of systems 200A or 200B can, for example, implement the method 300A. At block 316, a crude oil stream (such as the crude oil 102) is separated in a first crude oil separator (such as the HPPT 122) in a GOSP (such as the GOSP 200A or 200B) into a first gas stream (such as the gas 130), a first oil stream (such as the crude oil 132), and a first aqueous stream (such as the water 120). At block 318, the crude oil 132 is split into a first portion (such as the side-stream 210) and a second portion (the remaining portion of crude oil 132). At block 320, aqueous droplets present in the side-stream 210 are coalesced to form an aqueous phase (such as the aqueous phase 214) that is separate from an oil phase (such as the oil phase 216). In some implementations, after block 320 and prior to block 322, the aqueous phase 214 is separated from the oil phase 216. At block 322, at least a portion of the aqueous phase 214 is evaporated to form a wastewater stream (such as the wastewater 224) and a water vapor stream (such as the water vapor 226). At block 324, the water vapor stream 226 is condensed to produce a wash water stream (such as the wash water 230). At block 326, the oil phase 216 is mixed with the second portion of the crude oil 132 to form a rejoined oil phase. At block 328, the rejoined oil phase is separated in a second crude oil separator (such as the LPPT 128) into a second gas stream (such as the gas 136), a second oil stream (such as the crude oil 140), and a second aqueous stream (such as the water phase exiting the LPPT 128). In some implementations, after block 328 and prior to block 330, at least a portion of the second oil stream is flowed to a dehydrator (such as the dehydrator 126), which further dehydrates (that is, removes water) from the portion of the second oil stream to produce a dehydrated crude oil stream (such as the crude oil 140). At block 330, at least a portion of the second oil stream (such as the crude oil 140 discharged by the dehydrator 126) is flowed to a desalter (such as the desalter 118). At block 332, the wash water stream is flowed to the desalter 118.

EXAMPLES

Figure 4A:
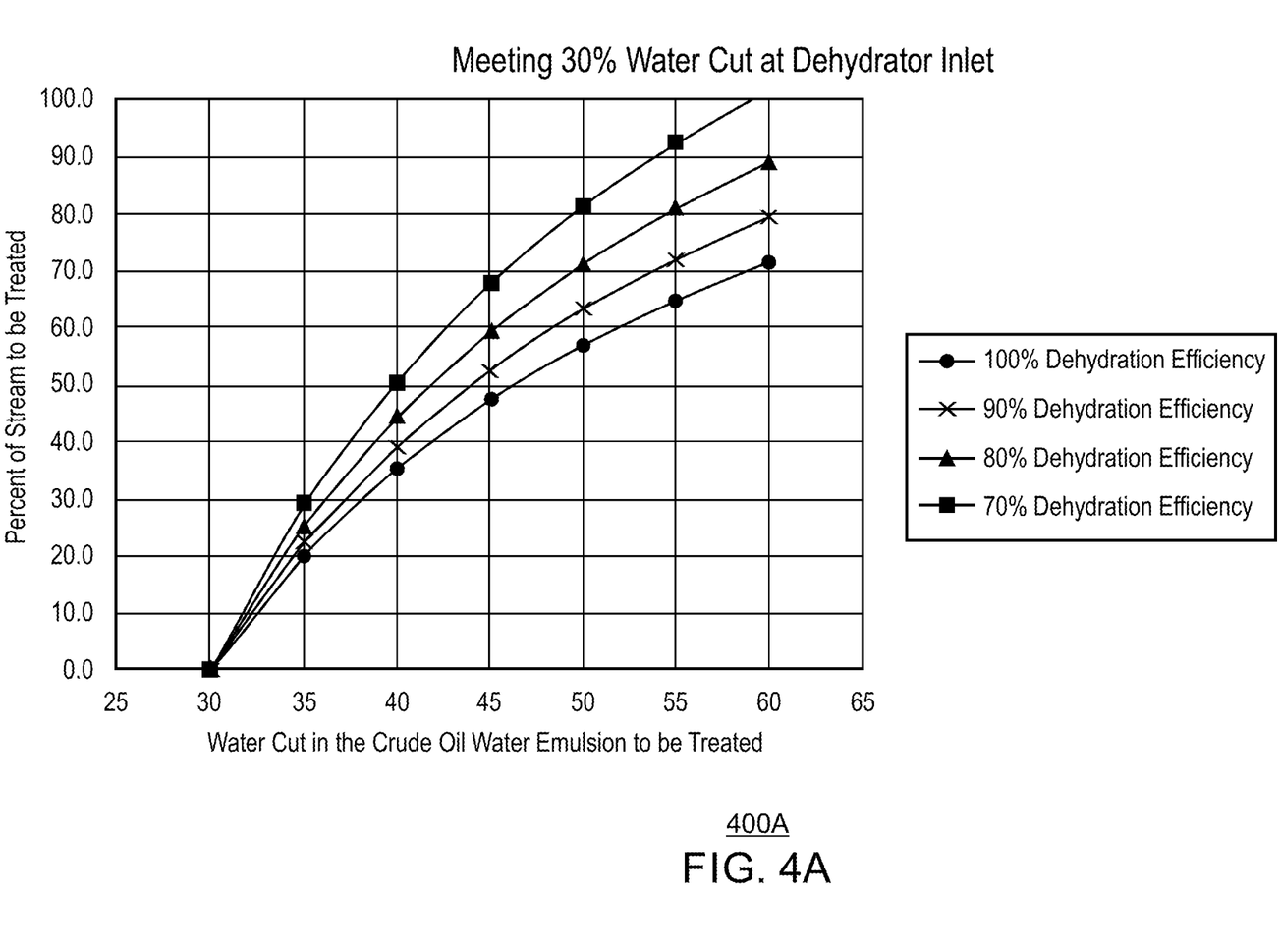
FIG. 4A is a graph showing percentage of the crude oil feed that is to be treated to meet a specified water-cut entering a dehydrator in a gas-oil separation plant at various dehydration efficiencies.

FIG. 4A is a graph 400A showing percentage (mass ratio of side-stream 210 to crude oil 102) of the crude oil feed 102 that is to be treated to meet a specified water-cut (for example, 30%) of the crude oil entering the dehydrator 126 at various dehydration efficiencies (70%, 80%, 90%, 100%) in the advanced GOSP 200A or 200B. As an example, with a dehydrator 126 efficiency of 90% in order to reduce the water-cut entering the dehydrator 126 from 45% to 30%, about 53% of the crude oil 102 needs to be treated. In other words, to meet those specified objectives in the previous sentence, the mass ratio of the side-stream 210 (branching from crude oil 132) to the crude oil 102 entering the HPPT 122 should about 0.53.

Figure 4B:
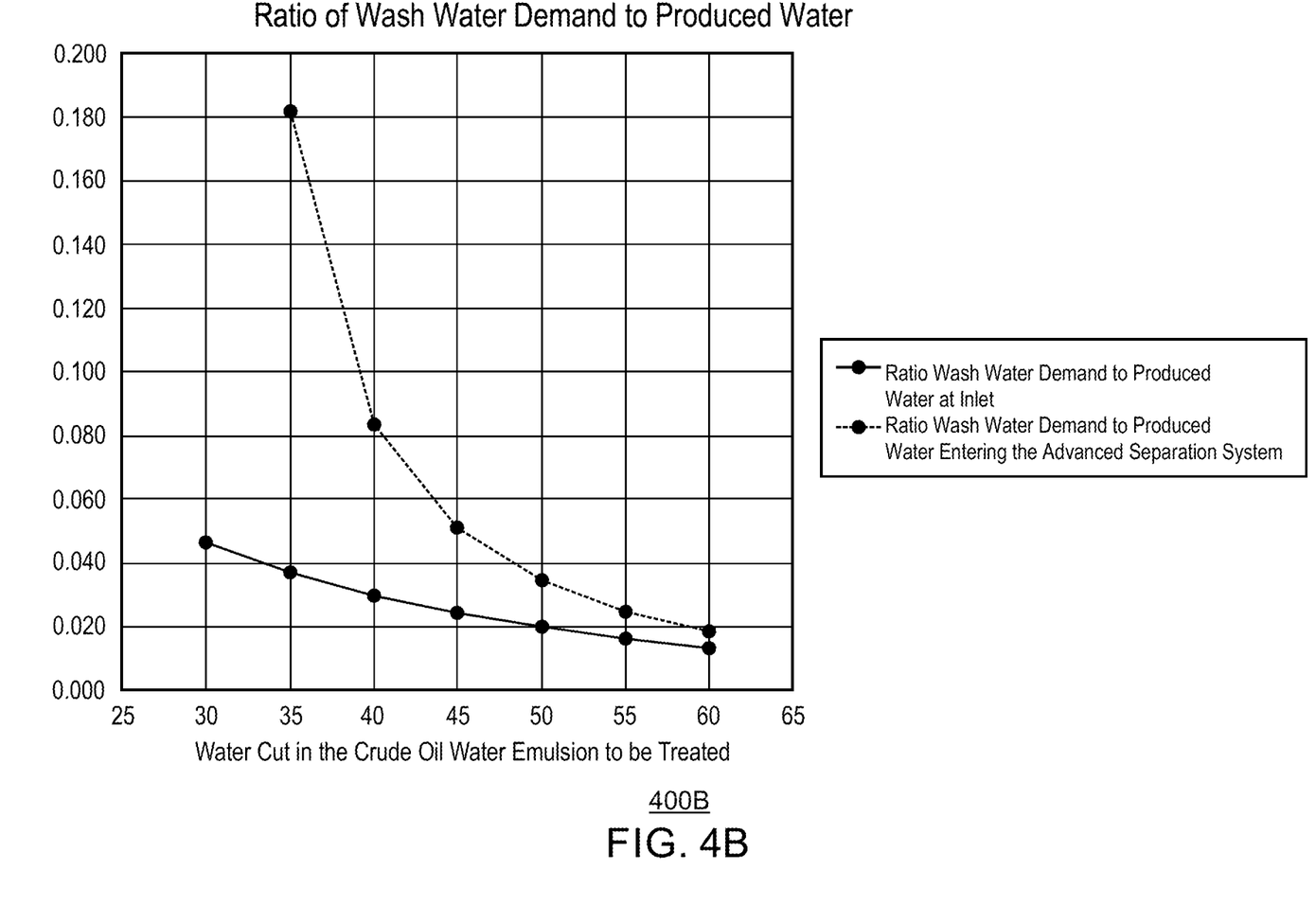
FIG. 4B is a graph showing the ratios of wash water demand over produced water entering a gas-oil separation plant and entering an advanced separation process.

FIG. 4B is a graph 400B showing the ratios of wash water (116) demand to produced water entering the GOSP 100, 200A, or 200B and entering the separation process via the side-stream 210. As an example, for a 45% water-cut, the wash water demand is about 2.5% of the produced water entering the GOSP 100, 200A, or 200B via crude oil 102 and 5% of the water entering the separation process via the side-stream 210. In other words, to meet the 45% water-cut, about 5% of the water present in the side-stream 210 needs to be vaporized to produce enough wash water for meeting the wash water demand by the desalter 118.

Table 1 provides process information of various streams of an example simulation of the system 200B shown in FIG. 2B. In this example case, the heat provided to the side-stream 210 by heat exchanger 232 is 10.51 million British thermal units per hour (MMBtu/hr), and the heat provided to the aqueous phase 214 by the heat exchanger 220 is 17.50 MMBtu/hr (Case 2 of Table 2).

TABLE 1

Stream conditions, flows, and compositions at various locations in system 200B

| | | Stream | | | | |
|---|---|---|---|---|---|---|
| | | 102 | 210 exiting 232 | 214 exiting 220 | Fresh water 116 | Feed entering 118 |
| Temperature | ° F. | 70 | 140 | 300.44 | 120 | 95.14 |
| Pressure | psia | 250 | 185 | 180 | 15 | 195 |
| Mass rate | kg/hr | 501672.5 | 177318.55 | 49001.56 | 4214.55 | 256319.91 |
| Methane | | 11615.02 | 264.95 | 0.00 | 0.00 | 1184.98 |
| Ethane | | 8113.41 | 1007.14 | 0.00 | 0.00 | 3258.34 |
| Propane | | 9012.56 | 2128.29 | 0.00 | 0.00 | 6319.31 |
| Isobutane | | 1545.71 | 455.00 | 0.00 | 0.00 | 1314.85 |
| Butane | | 6200.22 | 1917.34 | 0.00 | 0.00 | 5507.29 |
| Isopentane | | 2457.71 | 821.60 | 0.00 | 0.00 | 2335.91 |
| Pentane | | 4484.24 | 1518.79 | 0.00 | 0.00 | 4310.49 |
| N-hexane | | 8961.05 | 3132.13 | 0.00 | 0.00 | 8847.41 |
| Heptane | | 10210.03 | 3605.08 | 0.00 | 0.00 | 10165.27 |
| $H_2S$ | | 2780.19 | 440.70 | 0.00 | 0.00 | 1376.95 |
| $N_2$ | | 117.19 | 0.40 | 0.00 | 0.00 | 3.11 |
| $CO_2$ | | 9389.34 | 565.84 | 0.00 | 0.00 | 2077.21 |
| $H_2O$ | | 221857.09 | 88707.88 | 49001.56 | 4214.55 | 4717.55 |
| Octane | | 12014.95 | 4257.72 | 0.00 | 0.00 | 11996.80 |
| Nonane | | 12225.58 | 4338.00 | 0.00 | 0.00 | 12219.33 |
| Decane | | 12159.59 | 4316.48 | 0.00 | 0.00 | 12157.31 |
| Undecane | | 11209.77 | 3979.98 | 0.00 | 0.00 | 11208.99 |
| Hexadecane | | 157318.91 | 55861.23 | 0.00 | 0.00 | 157318.82 |

Table 2 provides process information of various simulations at different outlet temperatures of the side-stream 210 exiting the heat exchanger 232. The energy requirement to heat the side-stream 210 to achieve a 90%+ water separation downstream of the heat exchanger 232 depends on the emulsion stability (the relative ease of separating the wet crude emulsion stream into distinct streams of oil and water), and the efficiency of the coalescer 212. A hotter temperature is needed to achieve the requisite emulsion breaking (Case 1 vs. Case 5), which requires a greater energy penalty or operating cost. Operating at a lower pressure reduces the energy penalty by about 4-5% but may require the use of a vacuum pump, which can be an additional capital investment with associated maintenance and operating costs. Using the same duty as Case 1, the temperature of the entire feed stream 102 to the GOSP can be increased from 70° F. to 128° F. However, this temperature increase is insufficient to achieve the required emulsion breaking, and no wash water would be produced.

TABLE 2

Energy demands as a function of various conditions.

| Case | Outlet temperature of heat exchanger 232 (° F.) | Wash water 230 production vs. crude oil ratio (%) | Wash water 230 production pressure (psia) | Duty of heat exchanger 232 (MMBtu/hr) | Duty of heat exchanger 220 (MMBtu/hr) | Vacuum pump duty (MMBtu/hr) | Overall duty (MMBtu/hr) |
|---|---|---|---|---|---|---|---|
| 1 | 140 | 2.08 | 5 | 13.25 | 12.5 | 1 | 26.75 |
| 2 | 140 | 2.06 | 15 | 10.51 | 17.5 | 0 | 28.01 |
| 3 | 176 | 1.54 | 15 | 23.93 | 10 | 0 | 33.93 |
| 4 | 176 | 2 | 15 | 23.49 | 13.3 | 0 | 36.79 |
| 5 | 176 | 2.05 | 5 | 25.45 | 8.5 | 1 | 34.95 |

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    separating a side-stream from an oil phase stream discharged from a crude oil separator in a gas-oil separation plant, wherein the side-stream contains water and oil;
    flowing at least a portion of the oil phase stream discharged from the crude oil separator in the gas-oil separation plant to a desalter in the gas-oil separation plant;
    applying an electric field across the side-stream to coalesce aqueous droplets present in the side-stream to form an aqueous phase;
    separating the aqueous phase from the oil of the side-stream;
    evaporating at least a portion of the aqueous phase to form a wastewater phase and a vapor phase;
    condensing at least a portion of the vapor phase to produce a wash water; and
    flowing the wash water to the desalter.

2. The method of claim 1, further comprising rejoining the oil from the side-stream with a remainder of the oil phase stream discharged from the crude oil separator to form a rejoined oil phase, and flowing the rejoined oil phase to a second crude oil separator in the gas-oil separation plant.

3. The method of claim 2, further comprising separating, by the second crude oil separator, the rejoined oil phase into a gas phase, a second oil phase, and a second wastewater phase.

4. The method of claim 3, wherein the portion of the oil phase stream discharged from the crude oil separator and flowed to the desalter comprises at least a portion of the second oil phase from the second crude oil separator.

5. The method of claim 4, wherein at least the portion of the aqueous phase is evaporated via heat exchange with at least a portion of the gas phase from the second crude oil separator.

6. The method of claim 4, further comprising heating the side-stream prior to coalescing the aqueous droplets.

7. The method of claim 6, wherein the side-stream is heated via heat exchange with at least a portion of the aqueous phase.

8. The method of claim 7, wherein the side-stream is additionally heated via heat exchange with at least a portion of the wastewater phase.

9. The method of claim 8, wherein the wash water is produced independent of use of a membrane.

10. A system comprising:
    a side-stream branching from an oil phase stream discharged from a crude oil separator in a gas-oil separation plant, wherein the side-stream contains water and oil;
    a coalescer configured to receive the side-stream and apply an electric field across the side-stream to coalesce aqueous droplets present in the side-stream to form an aqueous phase separate from an oil phase;
    a separator configured to receive the side-stream from the coalescer and separate the aqueous phase from the oil phase;
    a heat exchanger configured to receive and evaporate at least a portion of the aqueous phase from the separator;
    a knockout drum configured to receive the aqueous phase from the heat exchanger and separate the aqueous phase into a wastewater phase and a vapor phase;
    a condenser configured to receive and cool the vapor phase to condense at least a portion of the vapor phase into a wash water; and
    a desalter configured to receive and mix at least a portion of the oil phase stream discharged from the crude oil separator and the wash water.

11. The system of claim 10, further comprising a second crude oil separator configured to receive a rejoined oil phase comprising the oil phase from the separator and a remainder of the oil phase stream discharged from the crude oil separator, wherein the second crude oil separator is configured to separate the rejoined oil phase into a gas phase, a second oil phase, and a second wastewater phase.

12. The system of claim 11, wherein the portion of the oil phase stream discharged from the crude oil separator and received by the desalter comprises at least a portion of the second oil phase from the second crude oil separator.

13. The system of claim 12, wherein the heat exchanger is configured to evaporate at least the portion of the aqueous phase via heat exchange with at least a portion of the gas phase from the second crude oil separator.

14. The system of claim 13, further comprising a second heat exchanger upstream of the coalescer, wherein the second heat exchanger is configured to heat the side-stream prior to the coalescer receiving the side-stream.

15. The system of claim 14, wherein the second heat exchanger is configured to heat the side-stream via heat exchange with at least a portion of the aqueous phase from the separator.

16. The system of claim 15, further comprising a third heat exchanger upstream of the second heat exchanger, wherein the third heat exchanger is configured to further heat the side-stream prior to the coalescer receiving the side-stream.

17. The system of claim 16, wherein the third heat exchanger is configured to further heat the side-stream via heat exchange with at least a portion of the wastewater phase from the knockout drum.

18. The system of claim 17, wherein the system is configured to produce the wash water independent of use of a membrane.

19. A method comprising:
- separating, in a first crude oil separator in a gas-oil separation plant, a crude oil stream into a first gas stream, a first oil stream, and a first aqueous stream, wherein the first oil stream contains water and oil;
- splitting the first oil stream into a first portion and a second portion;
- coalescing aqueous droplets present in the first portion to form an aqueous phase separate from an oil phase;
- evaporating at least a portion of the aqueous phase to form a wastewater stream and a water vapor stream;
- condensing the water vapor stream to produce a wash water stream;
- mixing the oil phase with the second portion to form a rejoined oil phase;
- separating, in a second crude oil separator in the gas-oil separation plant, the rejoined oil phase into a second gas stream, a second oil stream, and a second aqueous stream;
- flowing at least a portion of the second oil stream to a desalter in the gas-oil separation plant; and
- flowing the wash water stream to the desalter.

20. The method of claim 19, further comprising, prior to coalescing the aqueous droplets, heating the first portion via heat exchange with at least a portion of the aqueous phase, at least a portion of the wastewater stream, or both.

* * * * *